Feb. 25, 1930. L. ROSENBAUM 1,748,560
HAT WORKER'S BENCH OR CABINET
Filed Dec. 11, 1928 3 Sheets-Sheet 1
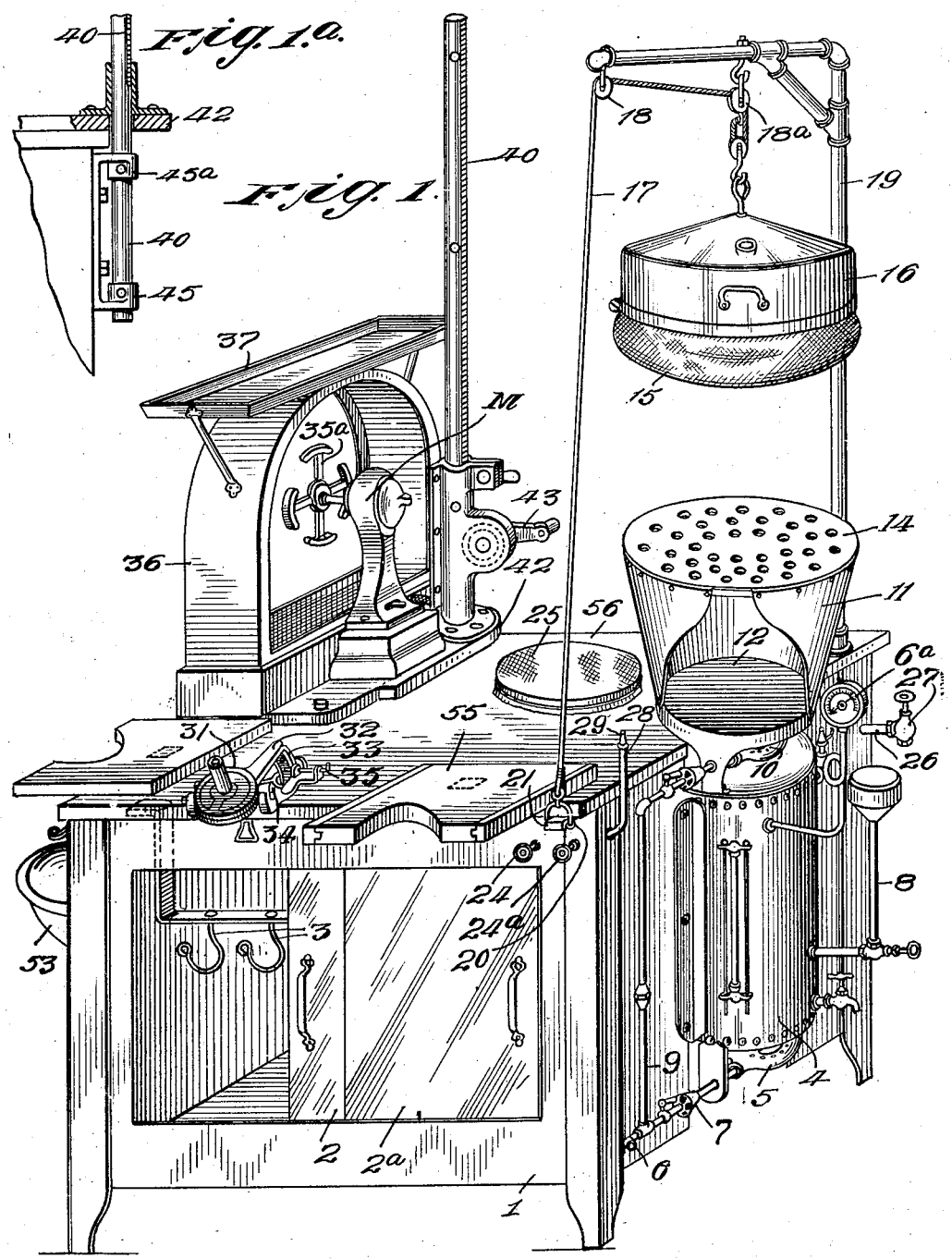
INVENTOR
Louis Rosenbaum
BY
Mocket Hum
ATTORNEYS Feb. 25, 1930.   L. ROSENBAUM   1,748,560
HAT WORKER'S BENCH OR CABINET
Filed Dec. 11, 1928   3 Sheets-Sheet 2
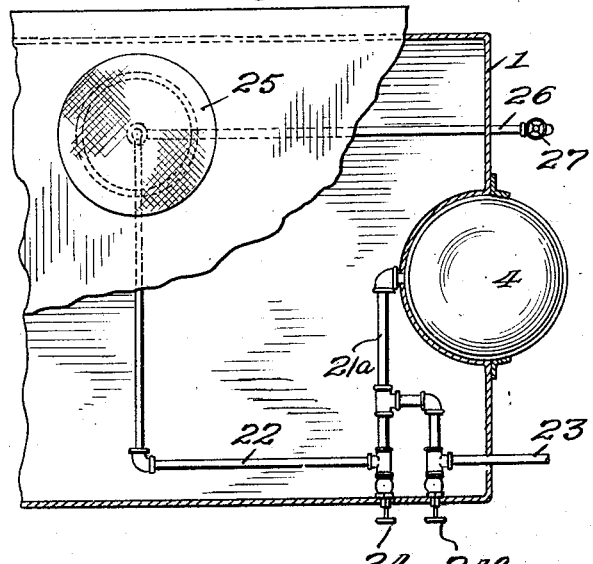
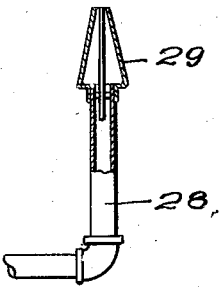
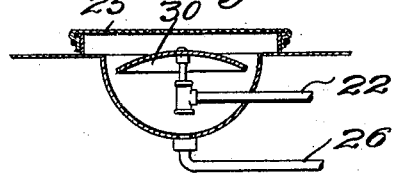
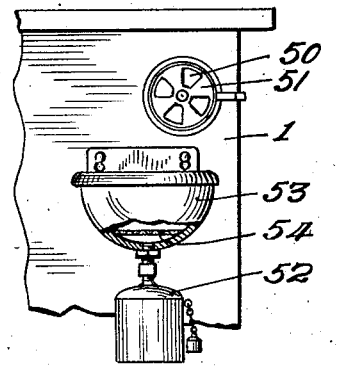
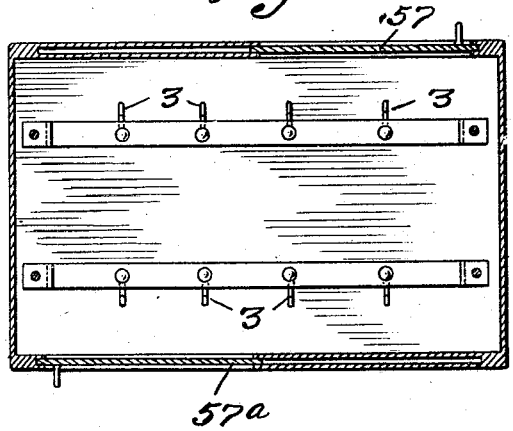
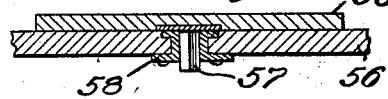
INVENTOR
Louis Rosenbaum
BY
ATTORNEYS

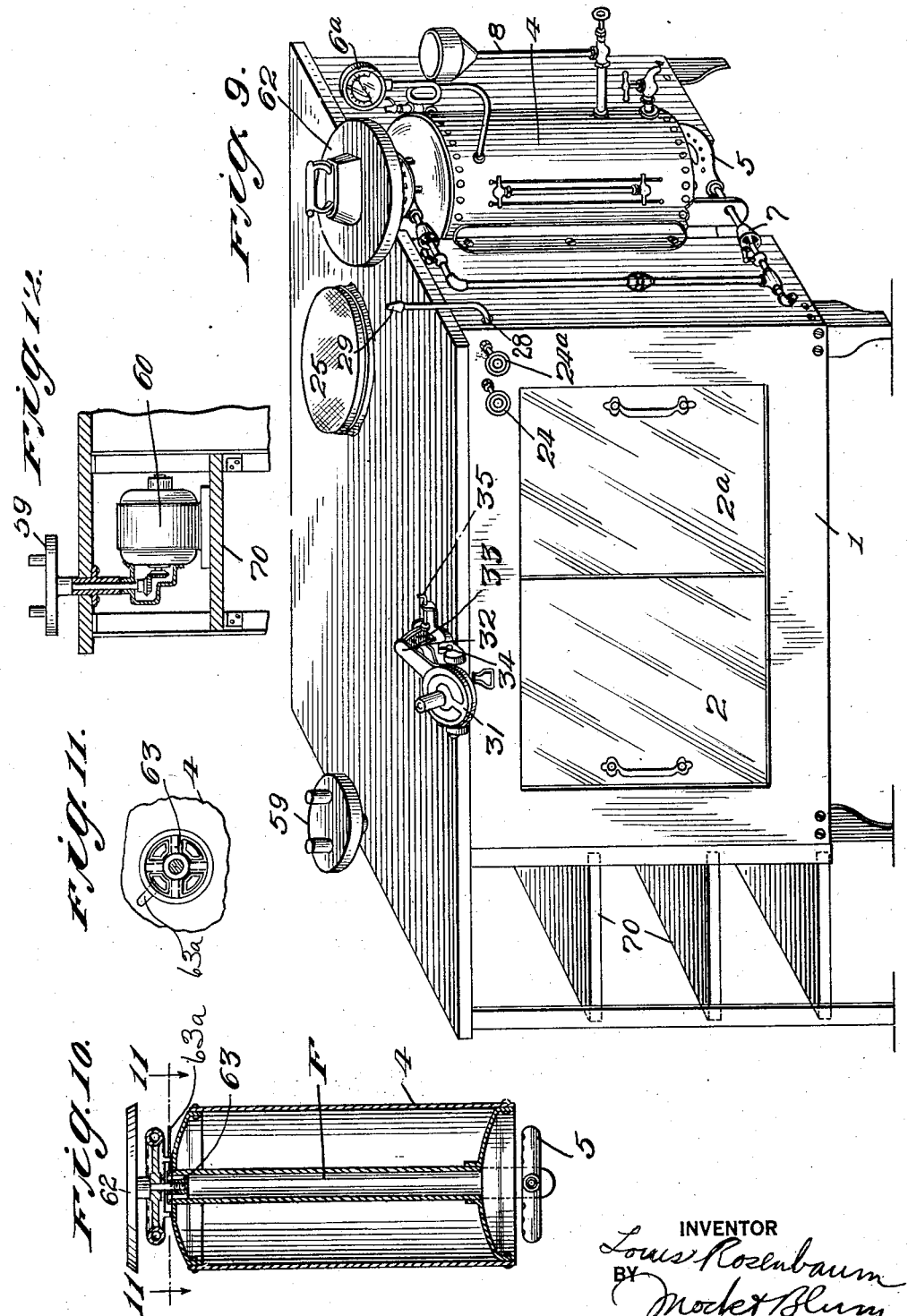

Patented Feb. 25, 1930

1,748,560

UNITED STATES PATENT OFFICE

LOUIS ROSENBAUM, OF NEW YORK, N. Y.

HAT-WORKER'S BENCH OR CABINET

Application filed December 11, 1928. Serial No. 325,343.

My invention relates to a new and improved hat-worker's bench or cabinet.

One of the objects of my invention is to provide a hat-worker's bench in the form of an improved cabinet, so as to utilize the heat supplied to the boiler as much as possible.

Another object of my invention is to produce a hat-worker's bench in cabinet form which shall be simple and convenient to use.

Another object of my invention is to produce a hat-worker's bench in cabinet form which will make it possible for two operators to conveniently work at opposite sides of the device.

Another object of my invention is to provide a hat-worker's bench in cabinet form in which the interior of the device is heated by means of the boiler utilized for supplying steam to various appliances commonly used by hat-workers.

Other objects of this invention will be set forth in the following description and drawings which illustrate preferred embodiments of this invention, it being understood that the above general statement of the objects of this invention is intended merely to generally explain the same and not to limit it in any manner.

Fig. 1 is a perspective view of one embodiment of my invention.

Fig. 1ª is a detail view.

Fig. 2 is a horizontal sectional view, partially in plan, showing the piping between the boiler and the various devices to which steam is supplied.

Fig. 3 is a sectional view partially in elevation showing the steam nozzle.

Fig. 4 is a sectional view, partially in elevation, of the steam pot.

Fig. 5 is a side elevation, partially in section, showing the outlet for the cabinet, and also showing the gasoline cleaning device.

Fig. 6 is a modification showing a different type of hat holding device, and a different type of door.

Fig. 7 is a detail view showing how the working board is held in position.

Fig. 8 is a detail view of the hat holding device.

Fig. 9 is a perspective view showing a modification of the device.

Fig. 10 is a sectional view showing a detail sectional view of the boiler used in this second embodiment.

Fig. 11 is a sectional view on the line 11—11 of Fig. 10.

Fig. 12 is a detail view showing the hat turntable on which the hat is turned.

The device shown in Fig. 1 comprises a cabinet 1 having sliding doors 2 and 2ª to close the front thereof. The interior of the cabinet is provided with hooks 3 mounted on suitable supports, upon which the hats can be hung to be treated with warm air. A boiler 4 is provided and this has a gas heater 5. The gas heater 5 is provided with a gas inlet 6 and a suitable device 7 for mixing the gas and the air. The boiler 4 is provided with the usual pressure gauge 6ª. The boiler 4 is provided with a boiler feed 8 for admitting water into the boiler 4. Some of the gas passes through a pipe 9 to an upper burner 10 which is located directly above the top of the boiler 4. The upper gas burner 10 heats a compartment 11 having a base 12 upon which flatirons may be placed to be heated.

It will be noted that the air which is heated by the boiler 4 can rise upwardly to additionally heat the compartment 11. Likewise, and as shown in Fig. 2, a large part of the boiler 4 is located within the cabinet 1, so that the air within the cabinet 1 is sufficiently heated by the boiler 4, and also by the piping within the cabinet which conducts the steam to the steam pot 25, for example.

The chamber 11 has a perforated top 14 which is used in conjunction with the sandbag 15 for shaping the hats. The sandbag 15 is connected to a metal holder 16 which can be raised and lowered by means of the cord 17 passing over pulleys 18 and 18ª. Said pulleys 18 and 18ª are mounted upon the upright frame 19 which is suitably connected to the cabinet 1. The rope 17 is provided with a hand-hold 20 which can be suitably latched over a projection 21 extending from the top of the cabinet 1. When the hand-hold 20 is released from said projection 21, the weight of the sandbag causes it to descend upon the hat held upon the member 14.

As shown in Fig. 2, the boiler 4 is provided with a steam-outlet pipe 21ª which is connected to branch pipes 22 and 23, said connections being controlled by means of valves 24 and 24ª. As shown in Fig. 1, the steam pot 25 has a top made of ordinary cloth so that steam can issue therefrom. The steam pot 25 is provided with a drain pipe 26 for draining water therefrom, said drain pipe 26 being provided with a valve 27. The pipe 23 is connected to the steaming pipe 28 which is provided with an outlet nozzle 29. The valves 24 and 24ª can be manipulated from the front of the cabinet so as to conveniently control the supply of steam to the steam pot 25 and to the nozzle 29. The valve 24ª can be located near the tip of the nozzle 29, so that the pipe 28 is always full of hot steam. Hence, when the valve 24ª is opened, dry hot steam (without water) passes immediately out of the steaming nozzle.

As shown in Fig. 4 the steam which passes into the steam pot 25 from the pipe 22, passes upwardly against a shield 30. The steam is thus caused to issue from the cloth top of the steam pot 25 in a uniform manner.

The hat block can be affixed to the jack or support 31. The support 31 is connected to the lever 32 which has a downward projection 33. The lever 32 is provided with lugs 34 which fit turnably in recesses of suitable arms bolted to the top of the cabinet. The projection 33 is provided with perforated flanges through any one of which a slidable pin 35 can be passed so as to adjustably hold the lever 32 at any desired angle.

The top of the cabinet is provided with an adjustably mounted centrifugal hat drying apparatus. This comprises a motor M whose shaft has a mandrel 35ª upon which a hat can be placed so that the same can be rapidly turned to whirl the water therefrom. A hood 36 is provided to prevent the water from being thrown around. This hood 35 is provided with a hat support 37. A vertical rack 40 is connected to the top of the cabinet and the entire device including the motor and the base 42 can be moved upwardly by means of a gear manipulated by the handle 43, said gear meshing with the teeth of the rack 40.

As shown in detail in Fig. 1ª, the bottom of the rack 40 passes through and is connected to arms 45 and 45ª which are connected to the back of the cabinet.

As shown in Fig. 5, the cabinet is provided with a hot-air outlet 50 which is provided with a turnable valve 51. The left hand side of the device is provided with a catch-pot 53 in which gasoline may be collected and cleaned.

The gasoline entering the pot 53 passes through a suitable filter 54 which may be made of chamois or the like, and the filtered gasoline enters a tank 52.

The top of the cabinet is provided with a work-plate 55. This is connected to the top 56 of the cabinet by means of a square pin 57 which fits into a corresponding square bushing 58 in the top 56.

As shown in Fig. 8, instead of having the single hooks 3, double hooks 3ª may be provided.

After the hats have been cleaned, steamed, or otherwise operated upon, they can be placed upon the hooks located within the cabinet to be acted upon by the warm air.

As shown in Fig. 6 slidable doors 57 and 57ª can be provided in the front and in the rear of the cabinet if desired. These doors are provided at diagonally opposite corners so that two operators can work at diagonally opposite corners and not interfere with each other.

As shown in Fig. 12 a horizontal turntable 59 can be provided upon which a hat is mounted so that it can be ironed by holding a flatiron in proper position, while turntable 59 turns around. The turntable 59 is connected to the shaft of a motor 60 as shown in Fig. 12. The boiler 4 is provided with a central flue F through which the gases from the burner 5 can ascend, to heat the plate 62 upon which the flatirons may be caused to rest. The top of the flue F is provided with a spider 63 and the plate 62 is connected to the central part of the spider 63. As shown in Figs. 9 and 10, a supplemental burner can be provided directly under plate 62, which can be used when lower burner 5 is in use or is out of use. As shown in Fig. 11, a damper or valve is provided for shutting off or regulating the air current through flue F.

Likewise, and as shown in Fig. 9, the cabinet can be provided with shelves 70 projecting from one side thereof.

The top of the cabinet can be made of steel wool or any other suitable material.

While I have shown the boiler 4 as partially projecting within the cabinet, in order to heat the interior thereof, it would not be departing from my invention if the heat of the boiler would be suitably transmitted to the interior of the cabinet, in any suitable manner.

I have shown preferred embodiments of my invention, but it is clear that numerous changes and omissions can be made without departing from the spirit of my invention.

I claim:

1. A hat-worker's cabinet having a drying compartment provided with a top, a steam pot located in the top of said compartment, a boiler having part thereof located in said compartment between the top of said compartment and the bottom thereof, part of said boiler laterally projecting from said compartment, said boiler being spaced from said steam pot, and pipe means located within said compartment and connecting said boiler and said steam pot.

2. A hat-worker's cabinet having a drying compartment provided with a top, a steam pot located in the top of said compartment, a boiler having part thereof located in said compartment between the top of said compartment and the bottom thereof, part of said boiler laterally projecting from said compartment, said boiler being spaced from said steam pot, and pipe means located within said compartment and connecting said boiler and said steam pot, said pipe means being controlled by a valve operable from the exterior of said compartment.

In testimony whereof I affix my signature.

LOUIS ROSENBAUM.